Figure 1:
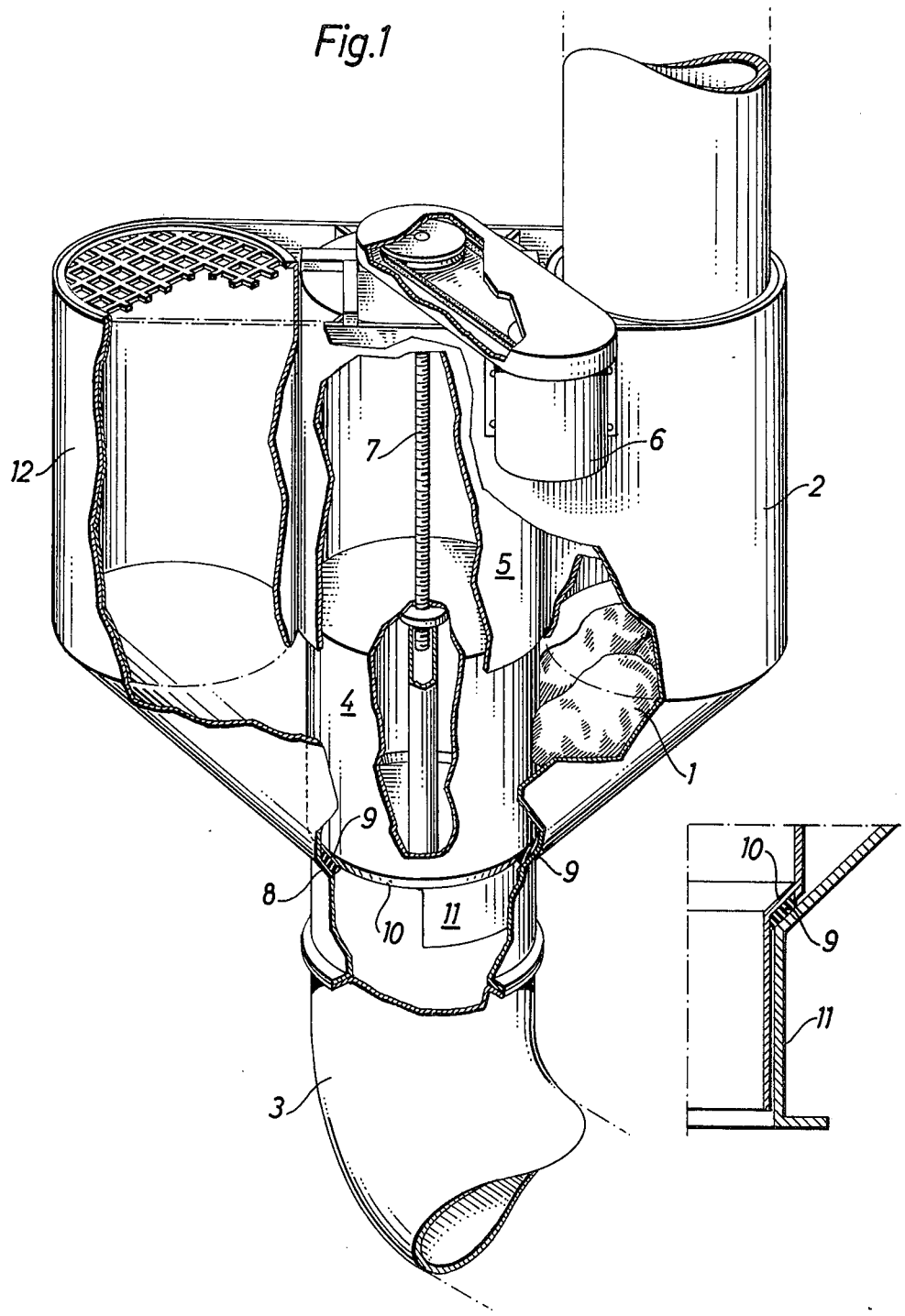

United States Patent [19]

de Feudis

[11] 4,074,921

[45] Feb. 21, 1978

[54] DEVICE FOR EMPTYING WASTE MATERIAL FROM WASTE-STORAGE CONTAINERS

[75] Inventor: Sergio de Feudis, Nacka, Sweden

[73] Assignee: AB Svenska Flaktfabriken, Nacka, Sweden

[21] Appl. No.: 745,811

[22] Filed: Nov. 29, 1976

Related U.S. Application Data

[63] Continuation of Ser. No. 582,884, June 2, 1975, abandoned.

[30] Foreign Application Priority Data

June 5, 1974 Sweden .............................. 7407391

[51] Int. Cl.² .................... B65G 53/14; B65G 53/46
[52] U.S. Cl. .................................... 302/39; 302/27; 302/36; 302/40
[58] Field of Search ............... 302/15, 17, 27, 35, 302/36, 39, 40, 41, 42, 47, 48, 51, 52; 193/29, 34; 137/625.4, 625.48, 625.49; 222/193, 194, 453, 504; 141/73, 80

[56] References Cited

U.S. PATENT DOCUMENTS

| 266,664 | 10/1882 | Viney | 137/625.48 |
| 503,439 | 8/1893 | Schmadeke | 193/29 |
| 1,335,800 | 4/1920 | Smith | 222/453 |
| 3,633,692 | 1/1972 | Lau | 141/68 X |
| 3,813,127 | 5/1974 | de Feudis | 302/27 |
| 3,964,650 | 6/1976 | Lau | 222/373 X |

FOREIGN PATENT DOCUMENTS 348,699   12/1972   Sweden.

*Primary Examiner*—Evon C. Blunk
*Assistant Examiner*—James L. Rowland
*Attorney, Agent, or Firm*—Cushman, Darby & Cushman

[57] ABSTRACT

A device for clearing waste material from at least one storage container, which can be closed by a bottom valve and is arranged at the lower end of a vertical dump shaft that opens into a branch duct of a pneumatic conveying duct, the bottom valve comprising a vertically movable valve body which in its closed position closes the waste container outlet and in its open position enables the refuse collected in the container to be released into the conveying duct, the sidewall of the valve chamber being fitted with at least one opening through which the contents of the waste container can be emptied into the branch duct unless the opening is closed by the valve body.

8 Claims, 3 Drawing Figures

DEVICE FOR EMPTYING WASTE MATERIAL FROM WASTE-STORAGE CONTAINERS

This is a continuation of application Ser. No. 582,884 filed June 2, 1975, now abandoned.

The present invention relates to a device for clearing waste material from at least one storage container, which can be closed by a bottom valve and is arranged at the lower end of a vertical dump shaft that opens into a branch duct of a pneumatic conveying duct, the said bottom valve comprising a vertically movable valve body, which in its shut position closes the waste-container outlet and in its open position enables the refuse collected in the container to be released into the conveying duct.

The fitting of a bottom valve at the lower end of a chute or waste container is well known. These known bottom valves comprise a gate or disk that can be displaced mainly in the horizontal direction from a shut position in which the gate closes the lower end of the chute or waste container, into an open position in which the said lower end is uncovered. This arrangement suffers from the disadvantage that the liquid often present in refuse will ooze out between the gate and the structure forming the shaft or container and will thus cause annoyance. Attempts at eliminating these difficulties have been made by designing various types of seal to engage with the gate and by providing devices for suction around the gate to drain off the liquor oozing out of the refuse. So far, however, no efficient solution of the leakage problem has been arrived at.

It is also known how to design the bottom valve as a vertically adjustable tubular structure inside the dump shaft proper. When the valve is shut the downward outlet of the said tubular structure seals against a stop face, which intercepts the refuse falling through the shaft. This known design has a number of disadvantages. As the driving mechanism of the tubular valve has to be arranged outside the dump shaft proper, one alternative is to place a screw device outside the shaft, an expensive arrangement owing to the heavy strain following from the asymmetric location. Another alternative is to fit two screw devices, one on each side of the shaft, thus achieving symmetric drive of the tubular valve with consequent moderate strain on the driving mechanism which, however, has to be designed for synchronous drive of both screws, making it expensive. This known design is further associated with difficulties of providing a satisfactory seal between the tubular valve and the bottom plate acting as stop face.

It is the aim of the present invention to provide a design in which all the above mentioned disadvantages are eliminated and which is easy to manufacture, and hence cheap.

Another object of the device according to the invention has been to arrive at a design that meets the requirements specific to refuse handling in areas of small houses.

These ends are attained by a device that is characterized mainly by the valve body's being displaceable within a vertical valve chamber that is detached from the waste container and fitted in an extension to the branch duct, the side wall of the said valve chamber being fitted with at least one opening through which the contents of the waste container can be emptied into the branch duct unless the said opening is closed by the valve body.

According to one embodiment of the invention the upper part of the valve chamber may be given a larger diameter than its lower part, thus forming a transition pipe of the shape of a truncated cone. By arranging sealing means to rest on this ledge and by designing the bottom valve corresponding, high sealing efficiency can be achieved when the bottom valve is in the shut position.

The valve chamber being detached from the waste-storage container, the driving mechanism for the displacement of the valve body can be arranged symmetrically in the valve chamber, which offers considerable advantages with respect to structural strength.

According to another embodiment of the invention the handling of refuse in small-house and terrace-house neighbourhoods is facilitated in that the cylindrical valve chamber can be arranged in a central position within the waste container, which is divided by radial walls into a number of waste-storage partitions along the periphery of the valve chamber, each partition having an individual opening to the valve chamber.

Figure 2:
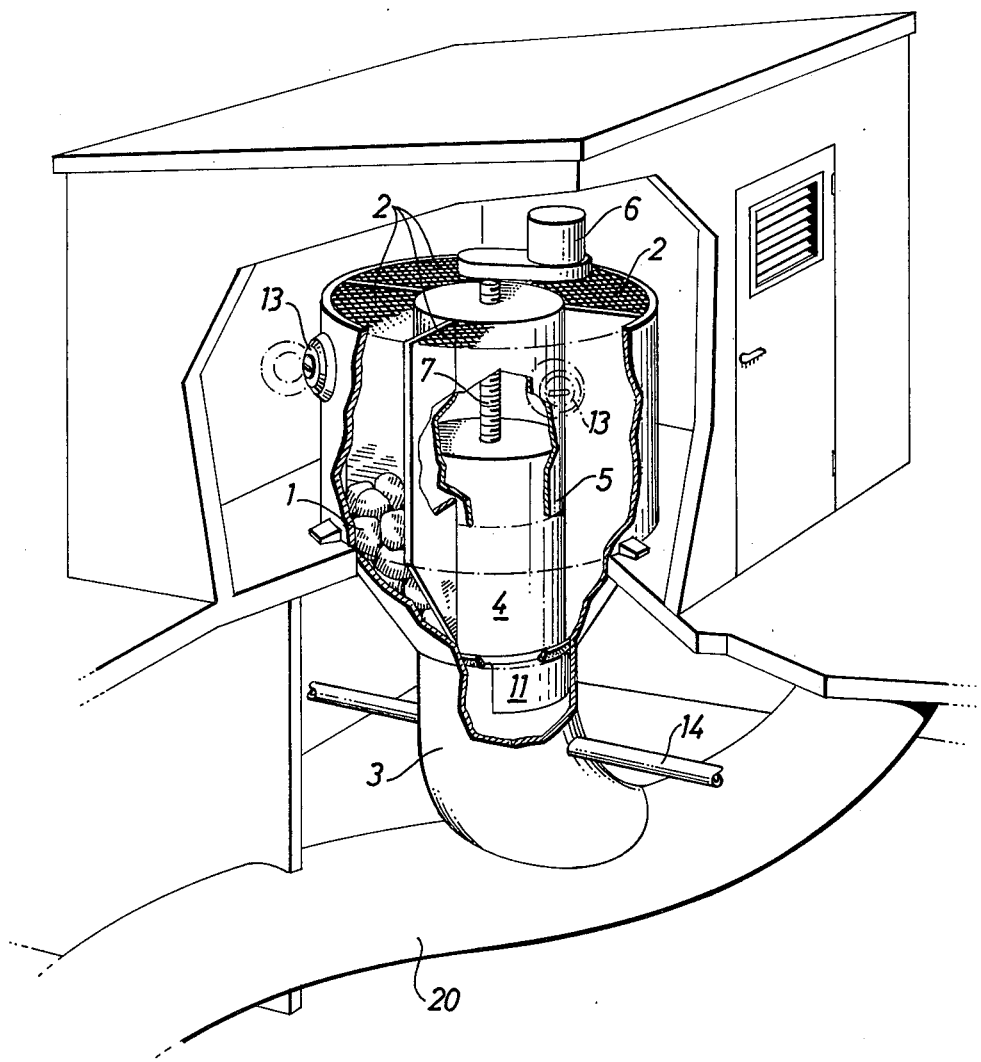
Figure 3:
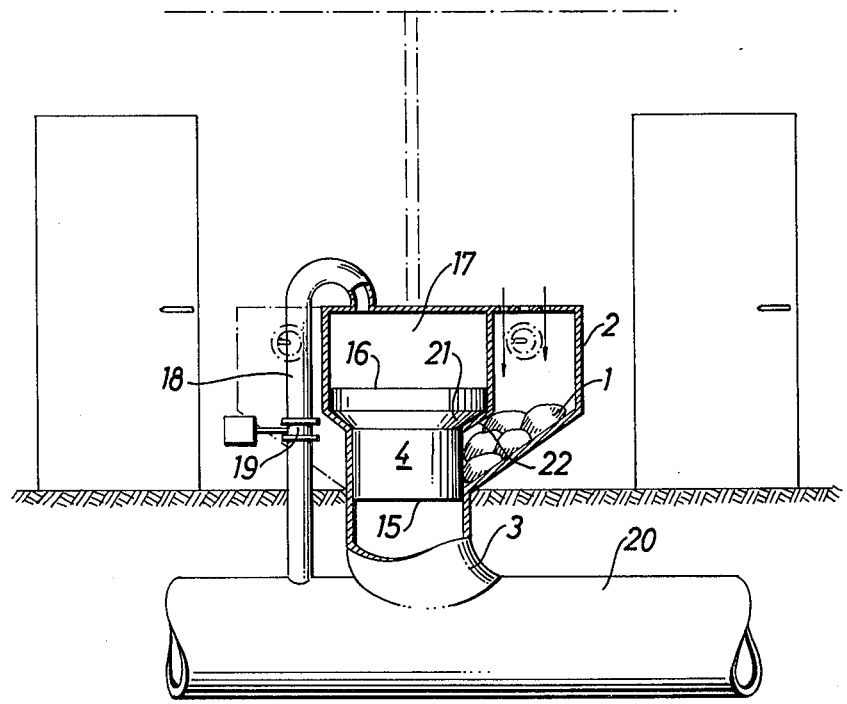

The invention can be implemented in a number of ways, certain embodiments being described as examples in the following paragraphs with references to the appended drawings, of which FIG. 1 illustrates an embodiment of a motor-driven discharging device according to the invention, designed to serve one waste-storage container and fitted with a separate inlet for delivery air, FIG. 2 shows a motor-driven discharging device according to the invention common to four waste-storage containers, and FIG. 3 illustrates a discharging device according to the invention, which can be actuated by the underpressure in the conveyor duct.

In the device depicted in FIG. 1 waste material 1 is discharged from a waste-storage container 2 what is arranged at the bottom of a vertical dump shaft. The container opens by a bottom valve into a branch duct 3 leading to a pneumatic conveyor duct. The bottom valve comprises a cylindrical hollow valve body 4 that is displaced vertically in a cylindrical valve chamber 5, the latter being designed as an extension to the branch duct 3. In a certain position the valve body 4 closes the outlet of the waste container 2. This outlet is designed as a port in the wall of the valve chamber 5. The bottom valve opens, i.e., the outlet of the waste container 2 is exposed by a motor's 6 operating a screw device 7 that engages a nut member in the valve body 4 by means of threads, causing it to move upward from the closed position. The upper part of the valve chamber is so designed as to have a larger diameter than the lower part, thus forming a ledge 8 at the transition level. A seal 9 is arranged to rest on the ledge 8 and the lower portion of the valve body 4 comprises a bevel 10 that fits against the said ledge, forming a seal against the ledge when the valve body 4 is in its shut position. An inlet 12 for delivery air opens into the branch duct 3 at the side of the valve chamber diametrically opposite the waste-container 2 opening. The valve body 4 in its lower portion also comprises a camshaped surface 11 so designed as to allow the air-inlet 12 opening to be exposed completely or in part at a certain position of 4 whilst the waste-container 2 port is closed. Hence, during the upward movement of the valve body 4 from its shut position the inlet 12 for delivery air is first connected with the branch duct 3, enabling delivery air to start flowing into the conveyor duct, after which the waste-container 2 opening becomes exposed.

FIG. 2 also shows a motor-driven discharging device according to the invention, in which the cylindrical valve chamber is arranged centrally in an external waste-storage container which is divided by walls into four waste-storage partitions 2 into which refuse is thrown through doors 13 in the container walls. Each storage partition 2 opens into the valve chamber, the openings being distributed along the chamber's periphery. In this embodiment the valve body 4 is shaped at its lower end to form a number of camshaped surfaces 11 of various heights so designed that when the valve body 4 moves upward from its shut position to its completely open position it will successively expose the ports of the waste-storage partitions, thus preventing the contents 1 of the individual partitions 2 from being discharged simultaneously into the branch duct 3, which would obstruct the duct. The waste-storage partition 2 that is first opened when the valve body 4 moves upward may be designed to act as a delivery-air inlet. The conveyor suction system according to the invention may also be supplemented in a known manner by pipes 14 for connecting a central dust exhausting system to the pneumatic conveyor duct.

FIG. 3 illustrates an embodiment of the discharge device according to the invention, in which the underpressure in the conveyor duct 20 is utilized form actuating the discharge device. In this embodiment the valve body 4 is given end surfaces 15, 16 of different sizes, the larger surface 16 being turned up. Further, the discharge device incorporates an airtight chamber at the larger end surface 16, the said chamber being connected with the conveyor duct 20 by means of a pipe 18. This arrangement enables the underpressure prevailing in the conveyor duct 20 to be extended also to the space 17. Owing to the difference in area between the end surfaces 15, 16 of the sealing valve body 4 and the resultant force acting on the said body, this will be displaced upward, thus exposing the ports of the waste containers 2. The pressure in space 17 and hence the movements of the valve body are controlled by a valve 19 inserted in pipe 18.

It is suggested that the valve body 4 comprise two cylindrical members arranged coaxially above each other, the two members having different diameters, a ledge 21 in the shape of a truncated cone thus being formed at the transition between the two said members. When the valve body 4 is in its lowest position, i.e., with all waste-partition 2 ports closed the ledge 21 rests on a corresponding internal sealing surface in the extension 5 to the branch duct 3.

I claim:

1. In a system for receiving and collecting solid household waste material and for discharging the solid waste material into a pneumatic conveyor duct the improved construction which comprises a waste-storage container for the solid waste having a vertical side wall portion provided with an outlet port and having a bottom wall portion which is inclined downwardly toward said port; wall means, including said side wall portion and port, forming a valve chamber, said valve chamber having a lower end connected by a branch duct to the pneumatic conveyor duct; a valve body vertically displaceable in said valve chamber between a lower, closed position in which said port is closed by said valve body and an upper, open position in which said port is open and in which solid waste material in the container passes through the port into the valve chamber and then downwardly into the pneumatic conveyor duct.

2. Apparatus as in claim 1 wherein said valve chamber is cylindrical.

3. Apparatus as in claim 1 including a motor driven screw extending through said valve chamber and cooperating with threads carried by said valve body whereby rotation of the screw displaces said valve body vertically.

4. Apparatus for collecting waste material and for discharging the waste material into a pneumatic conveyor duct comprising a waste-storage container having a vertical side wall portion provided with an outlet port and having a bottom wall portion which is inclined downwardly toward said port; wall means, including said side wall portion and port, forming a valve chamber, said valve chamber having a lower end connected by a branch duct to the conveyor duct; a valve body vertically displaceable in said valve chamber between a lower, closed position in which said port is closed by said valve body and an upper, open position in which said port is open and in which waste material in the container passes into the valve chamber and then downwardly into the conveyor duct, said valve chamber having a second port arranged so as to be opened, prior to opening of said outlet port, by upward movement of said valve body from a closed position, said second port being in communication with a supply of transport air.

5. Apparatus for collecting waste material and for discharging the waste material into a pneumatic conveyor duct comprising a waste-storage container having a vertical side wall portion provided with an outlet port and having a bottom wall portion which is inclined downwardly toward said port; wall means, including said side wall portion and port, forming a cylindrical valve chamber, said valve chamber having a lower end connected by a branch duct to the conveyor duct; a valve body vertically displaceable in said valve chamber between a lower, closed position in which said port in closed by said valve body and an upper, open position in which said port is open and in which waste material in the container passes into the valve chamber and then downwardly into the conveyor duct, said valve chamber being an upward extension of said branch duct and having an upper part of greater diameter than its lower part whereby a ledge is created at the transition between the upper and lower part, and said valve body having a corresponding configuration and forming an annular bevel which seals against said ledge when said valve body is closed.

6. Apparatus as in claim 5 including an elastic seal fitted on said ledge.

7. Apparatus as in claim 6 including a pipe connecting the upper part of said valve chamber above said valve body to the conveyor duct and a valve in said pipe, whereby a vacuum in the conveyor duct will result in an upward force displacing said valve body upward to an open position.

8. Apparatus for collecting waste material and for discharging the waste material into a pneumatic conveyor duct comprising a waste-storage container having a vertical side wall portion provided with an outlet port and having a bottom wall portion which is inclined downwardly toward said port; wall means, including said side wall portion and port, forming a cylindrical valve chamber arranged within the container, said valve chamber having a lower end connected by a branch duct to the conveyor duct; a valve body vertically displaceable in said valve chamber between a lower, closed position in which said port is closed by said valve body and an upper, open position in which said port is open and in which waste material in the container passes into the valve chamber and then downwardly into the conveyor duct, said container being divided by partitions into a plurality of compartments around the periphery of said valve chamber, and each of said compartments having a side wall portion provided with an outlet port communicating with said valve chamber.

* * * * *